United States Patent
Roeh

Patent Number: 5,218,430
Date of Patent: Jun. 8, 1993

[54] COLOR VIDEO TRANSMISSION

[75] Inventor: Gerhard Roeh, Bremen, Fed. Rep. of Germany

[73] Assignee: Erno Gmbh, Fed. Rep. of Germany

[21] Appl. No.: 566,793

[22] Filed: Aug. 10, 1990

Related U.S. Application Data

[63] Continuation-in-part of Ser. No. 384,886, Jul. 24, 1989, abandoned, which is a continuation of Ser. No. 43,225, Apr. 27, 1987, abandoned.

[30] Foreign Application Priority Data

Apr. 26, 1986 [DE] Fed. Rep. of Germany ....... 3614175

[51] Int. Cl.[5] ............................................. H04N 11/20
[52] U.S. Cl. ........................................................... 358/11
[58] Field of Search ............................................. 358/11

[56] References Cited

U.S. PATENT DOCUMENTS

| | | | |
|---|---|---|---|
| 3,506,775 | 4/1970 | McMann | 358/11 |
| 3,725,570 | 4/1973 | Gramling | 358/11 |
| 3,758,708 | 9/1973 | Yumde et al. | 358/11 |
| 4,027,333 | 5/1977 | Kaiser et al. | 358/12 |
| 4,539,592 | 9/1985 | Tanaka et al. | 358/152 |
| 4,543,607 | 9/1985 | Taylor et al. | 358/140 |
| 4,746,979 | 5/1988 | Kashigi | 358/22 |

FOREIGN PATENT DOCUMENTS 51186 5/1981 Japan ..................................... 358/11

Primary Examiner—John Shepperd
Attorney, Agent, or Firm—Ralf H. Siegemund

[57] ABSTRACT

The invention improves the reconstitution of video signals which are transmitted as sequential luminescence fields (odd and even), whereby, e.g. the relative position of the fields is determinative of color content. The three color and channel reconstituted signal is composed of one on-line signal, one stored and recalled signal, and one interpolated signal.

2 Claims, 3 Drawing Sheets

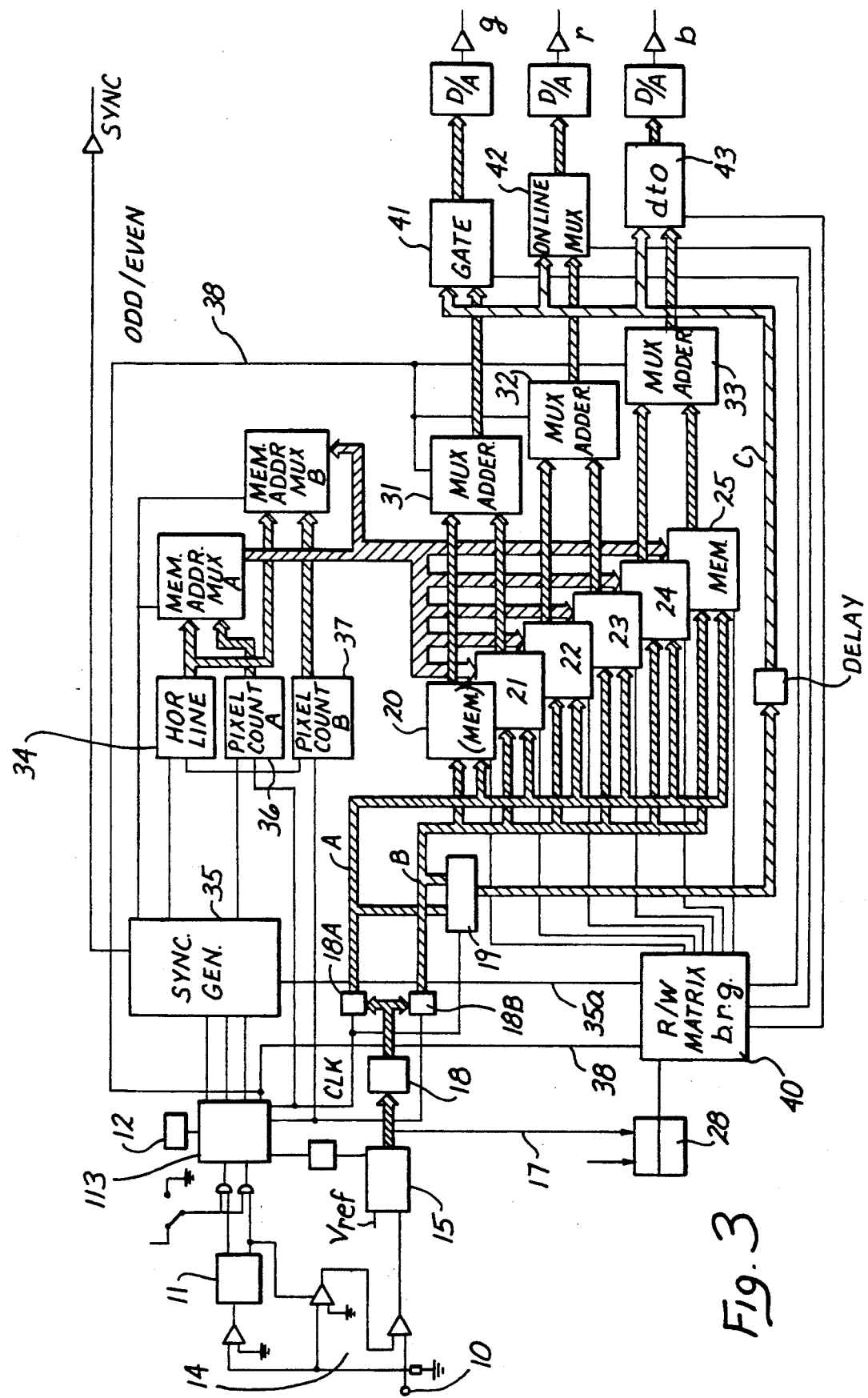

COLOR VIDEO TRANSMISSION

This is a continuation-in-part of co-pending application Ser. No. 384,886 filed on Jul. 24, 1989, now abandoned which is a continuation of Ser. No. 043,225 filed on Apr. 27, 1987, now abandoned.

BACKGROUND OF THE INVENTION

The present invention relates to a color TV and video system which includes taking (pickup) of pictures, transmission and reproduction and display particularly in these instances in which the pictures are taken in outer space and reproduction and replay is to occur on Earth. The system is to include a camera operating with particular standardized colors, interlaced fields and luminescent signals, being multiplexed series signals with color frame and identification and separation, synchronization and reproduction of the video signal in accordance with the standardized features contained in the information.

A system of the type to which the invention pertains is for example used for taking multicolor pictures in outer space, transmitting the image information in some form across space and reproducing the images on Earth. The system of this type is known, for example, under the designation "Sequential Color Transmission System". Herein a complete image is broken down into six monochromatic fields using, for instance, prime colors red, green and blue, and respective two interlaced fields pertain to the same and color in the usual interdigitized fashion composing a full monochromatic frame. These partial images or monochromatic fields are sequentially and serially transmitted to a receiving station. The total signal of one monochromatic field lasts 16 ms so that as a consequence a complete multicolor image requires 96 ms for transmission. For principal reasons each field as such does not contain color information but is only a black and white signal. This is the advantage of a high resolution as each color signal is transmitted simply in terms of brightness variations (luminence signal) and the color is restored on ground indirectly. Thus any color distortion does not occur as such during the transmission. However, owing to the frequently long transmission periods, the sequential images may exhibit certain color fringes.

DESCRIPTION OF THE INVENTION

It is an object of the present invention to provide a new and improved sequential color transmission system which avoids the color distortions and fringes and having as a specific goal the processing of the color signals themselves as they are received.

It is a particular object of the invention to process transmitted video signals wherein each image frame is composed of six sequentially, concatenated field signals, two for each color and differing by odd/even field identification as to interlacing.

In accordance with the preferred embodiment of the invention, it is suggested to compose a multicolor signal from the transmitted video signal received as per the particular object by way of simultaneously presenting three different color field signals of the same type (odd or even) in that one field signal is derived on-line, in real time, from the transmitted signal, a second field signal is derived from a store without interpolation, if that stored signal pertains to a different color but is of the same type, while a third (color) field signal is generated by interpolation from stored signals if the stored signals pertain to fields of the opposite type and having been, as to that third color, transmitted more recently than a field of that third color but of the same type as the on-line signal field.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a block diagram for decoding the information as transmitted;

Figure 1:
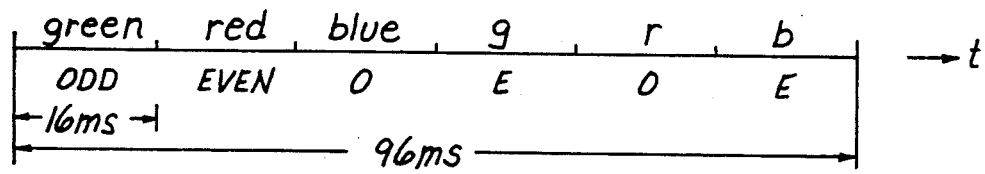
FIG. 1 is a schematic diagram showing the format for serial transmission of color information in the known sequential color transmission system.

Proceeding to the detailed description of the drawings as one can see from FIG. 1 a complete video image and frame is comprised of a plurality of monochromatic fields which have been separated from multi or poly colored fields of view through suitable color filters. The separation results in three monochromatic images (black and white) for the three prime colors (red, green and blue) with each such frame being further divided into two interdigitized fields which can be also designated to be "odd" and "even" fields owing to the interdigitization and line scanning and (basically arbitrary) consecutive line numbering. Within one particular green field, moreover, a color frame synchronization signal CF is included, e.g. in the beginning (see FIG. 2). The six fields are multiplexed in a time shared fashion. The color signal itself is just a luminensce signal wherein each field covers 16 ms, the total of six fields for one complete image covers 96 ms.

As one can see further from FIG. 1 three signals pertaining to a field have different colors and for each color there is an odd field and an even field. Owing to the exact prescribed and standardized sequence of fields in the transmission the image can be restored with certainty. It can also be seen that owing to the sequential and spaced character, e.g. of the two green fields (or blue or red fields) each such pair is separated by two other fields. Hence there is an inherent delay in the color series, e.g. the two green fields are spaced apart timewise which accounts for certain image distortions and color fringe effects.

Figure 2:
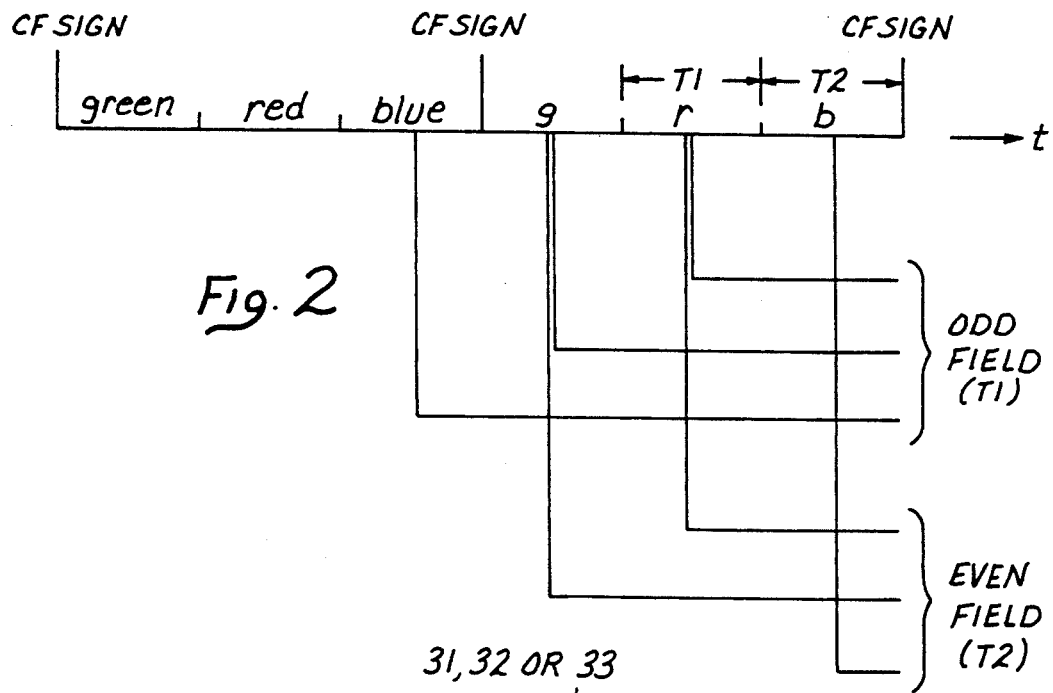
FIG. 2 is a schematic diagram showing the scheme of reconstructing multicolor fields from the monochromatic fields with associated color information in accordance with the preferred embodiment of the present invention for practicing the best mode thereof.

Upon processing the color signals in accordance with FIG. 2 these color distortions and fringe effects can be avoided, or at least minimized to a substantial degree. Again the Fig. shows the odd and even fields for each of the three prime colors red, green and blue but, in addition, a certain processing aspects of these signals are disclosed. During any particular field period the signal for one color is derived directly from the series of signals and combined with two other signals of which a first one was temporarily buffer stored and a second one was buffer stored and processed through interpolation. This way, one establishes a polychromatic half (or field) image. For example, during the period T1, the odd red signal is directly available. An odd-blue signal was previously received, stored and can now be made available. An even-green signal was also received, has been stored and is now made available and processes as odd-signal through interpolation. This is described in greater detail with reference to FIG. 5a. During period T2, blue even is directly on line, green even was stored earlier and is now recalled and red-odd is also recalled but in duplicate and used for forming an interpolation signal. This is shown in greater detail in FIG. 5b.

It can readily be seen that the color signals of these field requires, respectively, storage periods of not more than 32 ms. Hence any kind of distortion can at most occur within the order of 32 ms and that is no longer discernible in the human eye.

The inventive processing of the color signals offers the advantage that the known color TV system as far as the camera and the vido pickup is concerned does not require any basic changes in the system as such, so that the particular advantages inherent in that existing system remain, including aspects of signal transmission. The prior art convention as represented by the signal format shown in FIG. 1 is retained. The camera e.g. can be of the color wheel variety wherein a periodic change in optical filters occurs. Another possibility is to use a CMOS camera of the so called three chip technology with multiplexer. Such a camera has the advantage that one does not need any mechanical parts. Any switching is carried out electronically. This approach offers the advantage of smaller weight and smaller volume. The multiplexing of the color signals into a series of signals as required by the system, is directly produced by the multiplexer which is connected to the color chips.

For processing the series signals as received a decoding circuit is needed in the ground station, i.e. the receiver. A suitable example for such processing, particularly decoding, is shown, for example, in FIG. 3. Here the serial signal is processed to obtain and restore color signals for various systems such as NTSPA, PAL or SECAM. The signal to be decoded is received at the input 10 and passed to various channels. It is repeated, that this signal is a serial one as shown in FIGS. 1 and 2, odd/even fields alternate, so are the colors. The format is a prescribed one.

The circuit 14 clamps the floating video signal to the blacker-than-black level and thus decodes sync signals generally for use in timing circuit 113. In addition line 17 from A/D converter 15 feeds, the color frame signal to the color frame sync detector 18 which provides a controlling input to the read/write matrix 40.

Circuit 19 is an online pixel MUX receiving a 5 MHz clock and also receiving video signals from the A and B channels. These are at that point controlled by latches 18A to 18D, providing a distributing format changing function for the signals arriving from the ECT/TTC conversion unit 18; the latter receiving its input from the A/D converter 15! The decoder is designed for video signals with an upper limit frequency of 5 Mhz. This means the decoder is capable of processing signals in accordance with the internationally standardized bandwidth. Depending upon the scanning theorem and algorithem that is being used the frequency for a particular image element (PIXEL) is F>=2.4 * 5 Mhz. In practice this is a frequency of 13.33 Mhz. Each image element requires for acquisition by scanning, a scanning period of time of 75 ns. Owing to the additional digital data a storage and buffering time for a video line is required amounting to 64 ms−6 ms=58 ms. The 6 ms are set aside for the synchronization. This results in 773 image elements per video line.

The video line signals are series signals and are fed as such to any analog-to-digital converter 15 providing, for example, a 7-bit signal per analog video element which has sufficient resolution. This means that this particular converter establishes 128 contrast (gray) levels between full black and full white. The decoder circuit includes six field storage circuits 20, 21, 22, 23, 24, and 25 being buffer storage chips with a capacity of about 256 kilobytes. The reason for using the same information in two buffers, is to prevent slow down by the interpolation where the "same" information on any given line point must be available twice with the same field period for obtaining two interpolations once for a line point directly above and again for a point below. Since each storage chip has a storage cycle of 150 ns the data rate is divided by two by means of the demultiplexer for the particular video transmission of six and ⅔ Mhz. The output of converter 15 is passed through a signal format conversion stage (such as ECL-to-TTL) 15a and from there to the two signal distribution latches 18a and a8b. The demultiplexed and split-in-two data sequence is thus distributed into the two data bus lines A and B. Owing to the fact that the same field is available in two concurrently accessible stores (20,21;22,23;24/25) serial adding obtains without loss in speed. The operation still continues at real time speed, i.e. at the rate with which the data comes in!

In other words an even "green" field is distributed into the two buffers 20, 21. Later an odd green field is analogously distributed. This means that when the even field is distributed into buffers 20,21, one line from 20 and one line from 21 (A and B) can be combined to interpolate the odd line between them and vice versa. The data rate on the bus lines A and B is now 150 ns per incremental image element which can be handled by the storage devices. Each of the field stores or memories 20–25 is comprised of 2 * 7 storage chips which alternatingly, symmetrically, receive signals from the bus lines A and B. The storage devices are operated (accessed) such that the line address corresponds to the line number of the respective field. The column address corresponds to the respective PIXEL number within a line. The stores are read out by multiplexers 31, 32, and 33, so that a signal can be taken from the output of the multiplexers having the original data rate of 13.33 Mhz.

The synchronization obtains as follows. Independent from the distribution in A and B, the video signal is stripped off the horizontal and vertical synchronization pulses (circuit 11). Numeral 12 refers to a 20 MHz quartz oscillation driving the timing circuit 13. Additional signals that are needed such as signals for the field representation distinguishing between odd and even are produced by means of an external synchronizing generator 35. This generator takes also care of the synchronization of still pictures and serves as master stage in this regard. The pixel scanning rate is derived from the oscillator 12 and the timing circuit 13 that operates the analog-to-digital converters 15, using in addition the two pixel address counters 36 and 37, respectively, for the signals on busses A and B.

In order to avoid splitting of image points it is necessary to begin the pixel clock rate as exactly as possible in phase synchronism with the line sync pulse. Assuming, a maximum jitter pulse of about 25 ns which is ¼ of th temporal length of an image increment the requisite phase synchronization can readily obtain. For this one divides the 40 Mhz quartz clock signal 20 MHz, after a 1:2 step up). The trailing edge of the synchronization signal is passed through an exclusive or member and a latch stage so that the requisite 40 Mhz clock signal, if necessary is inverted. Subsequently a central control pulse is derived from the 40 Mhz signal which control pulse has the length of 25 ns and will not coincide with the leading edge of the 40 Mhz signal. This way the frequency divider receives a control signal to establish a very accurate time reference in relation to the line synchronizing pulse. Moreover, the 40 Mhz may be inverted depending upon the instance of occurrence of the controlling signal. The residual jitter pulse will have a period equal to that of the 40 Mhz clock signal which is 25 ns.

The read/write matrix circuit 40 receives controlling inputs from color frame synch detector 18 which taps the output of 15. In addition matrix 40 receives the odd/even signal from line 38 and a frame/field signal from sync generator 35. With these inputs, circuit 40 manages the control of the storage process, i.e. it selects which of the stores 20 to 25 is to be filled or read out or its content interpolated. Moreover, this matrix provides for the read/write control of the stores 20 to 25 and selects that one of the RGB output circuits 41, 42, and 43, which is to receive the on-line and direct, real time video signal, to be dumped thereafter (e.g. red-odd during Ti, FIG. 2). The two other ones of the circuits 41, 42, 43 will receive stored signal via two MUX odd-/even 31, 32, 33 circuits. These MUX circuits 31, 32 and 33 are actually serial adders; they are under control of the odd/even control signal in line 38, that was stripped off the incoming signal, by synch operation circuit 13.

The color frame signal (extracted from the main data flow by circuit 44) is decoded in the matrix 40 under operation of the odd/even signal line 38. This places the color synchronization counter in the matrix into an initial state in the beginning of a green field, then arriving the received video fields. Moreover, the on-line image is connected to the "green" exit (41). Also a bi-stable green switching stage is loaded with the selective information, odd or even. This switching stage now represents detailing information for the green field, i.e. the stage indicates whether the currently arriving green field is odd or even. The information is updated only after the next green field arrives; the content of the bistable switching stage therefore indicates whether or not the information contained in that stage, and to the extent it relates to any particular color, does provide with information whether upon read-out from the buffer stores, the data are to be interpolated or not. The bi-stable switching stage could also be termed the odd-/even store. Of course, the same situation is true with regard to the red and blue images and colors. They each have their corresponding odd/even stores and stages.

Figure 4:
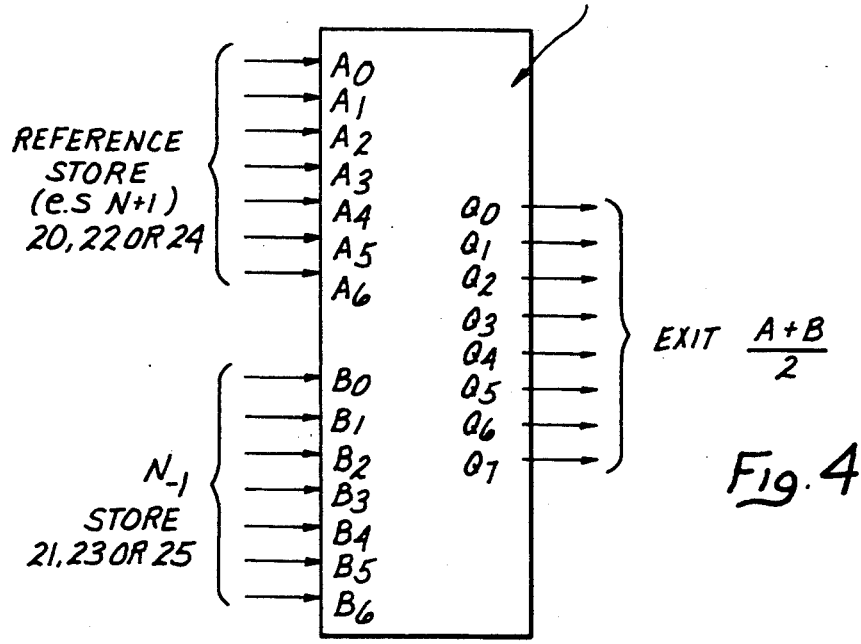
FIG. 4 is a block diagram for obtaining the requisite interpolation that is needed than practicing and using the system shown in FIG. 3.

If in a case of a particular color the content of that odd/even store agrees with an odd or even field arriving at that time, then interpolation does not take place. If however these two informations disagree, interpolation obtains in accordance with the circuit shown in FIG. 4. It depends on which direction the interpolation is supposed to take place from odd to even or from even to odd. For making this determination an n+1/n−1 store with single value, positive or negative offset signal is read from the line address. Generally speaking one will interpolate only if there is a line offset. If both stores have the same data then the data in the bus lines A and B should be the same for the same line address. In this case, then data are read out as they are being stored, otherwise interpolation obtains.

Looking at FIGS. 1 and 2 one can see that owing to the alternation of odd/even as to the fields, any odd field that is on line, was preceded by an even field of another color, so that that latter field when suitably stored in a pair of memoried can be used for interpolation by the associated MUX-adder to generate an odd-field of the same color. The third field is one that occurred still one field period earlier; it is of the second color and remains stored and is thus available as the third color component for the next field. Details are explained below by way of example and with reference to FIGS. 5a and 5b.

Decoding for the received serial signal provides that the decoder (MUX 31, 32 or 33) is either operated in a conventional manner or in an interpolation mode. This way it is made possible in a very simple manner to reduce the color fringe effect that was known otherwise. Line and image points with digital supplemental information are in all cases directly passed to the three RGB (41, 42, 43) exits. Owing to their digital nature they appear to be only black and white signals. The digital supplemental information is also passed to all stores. Should the decoder operate for processing still pictures then this supplemental information will appear wherever it was received.

In any given point in time, the system stores three fields in the six stores 20 to 25, because each field is distributed in two stores. These fields are available either directly for call up or in an interpolation mode by calling on two stores alternatingly at the pixel rate and through the respective MUX (31 or 32 or 33) an interpolated signal is generated. Hence, the output gates 41, 42, 43, in cyclically variable constellations, are operated such that one passes the on-line signal (bus C) one passes a stored signal pertaining to an earlier field transmission, and the third one passes an interpolated signal from the immediately preceding field. Composition examples have been explained above with reference to FIG. 2. In T2, gate 43 passes the on-line signal; gate 41 passes a stored even signal; and gate 42 receives a MUX signal generated as an interpolated signal by the MUX circuit 32 from store 22 and from store 23, and depending on the state of the odd/even indication for "red"; this interpolated signal is an even signal generated from odd field lines which had been distributed in 22 and 23. Thus, in any instant, the three gates 41, 42, 43 compose a multi-color field by operation of passing three monochromatic field signal, having particular color values, and being from field period to field period composed from signals of different origin: one on-line (real time), one as stored, and one from storage after interpolation.

It can thus be seen, that normally the following sequence of storage obtains. Considering the sequence as given by the format illustrated in FIGS. 1 and 2, the storage is 20 and 21-odd green; 22 and 23-even red; 24 and 25-odd blue; 20,21-even green; 22,23-odd red; 24,25-blue even. This is the normal state of affairs, because for interpolation one needs the same information twice to concur; but any field has to be available in duplicate only for two field periods. Any full cycle consists of six field periods. In each field period we construct an image out of three fields; one being on line; one having been stored earlier, one being the result of interpolation of the content two fields, stored in the preceding field period. So, during the odd green field period, 20 and 21 receive the on-line signal; during the even green field period, both receive the even signal, by way of A-B distribution. During any given field period the same signal is used directly on line and stored in two memories; previously stored signals of another color are used directly, while signals of the third color, previously stored in two other memories are used for interpolation.

One can also look at the situation from the following point of view. During any field period, odd or even, the most current information is used on line. The preceding field period saw a different color field transmitted as to "oddity" in opposition (that is even or odd). Both respective memories pertaining to that color were filled, and they are presently used for interpolation. Two field periods back, the third color was used to fill two further memories. Their content was used for interpolation in the field period preceding the one currently considered and now the content of just one of them is used as the third color.

Readily one can see that this operation cyclically repeats itself in six different but compatible and similarly structured patterns. These patterns depend on the following aspects: each field when it arrives (i) is used on line directly. (ii) it is stored in two memories to be used during the next field period for averaging. (iii) two field periods later, one of the memory contents is used as third field color component. This pattern is cyclically repeated.

Figure 5A:
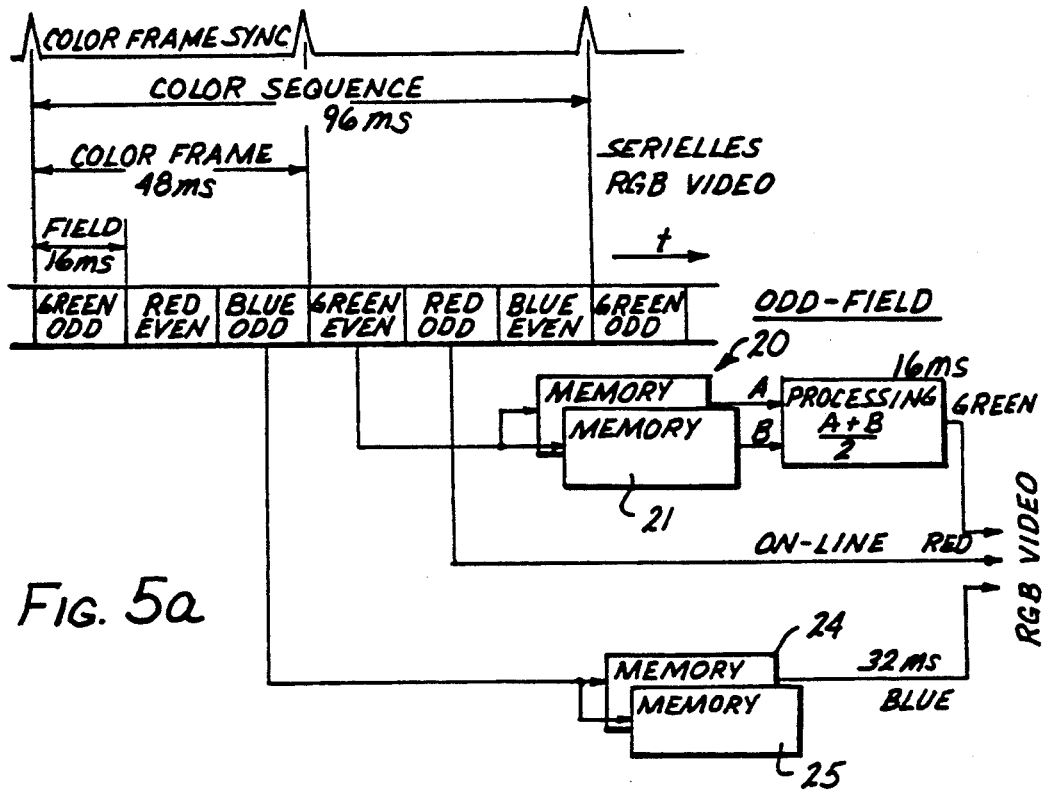
FIGS. 5a and 5b are diagrams combining relevant portions of FIG. 3 with the diagram of FIG. 2, to explain the signal combination and generation aspect.

FIG. 5a shows specifically how to proceed during a particular period of time, e.g. while a red-odd field is received. In the preceding period the green even signal was distributed into memories 20 and 21 and the MUX 31 provides for the interpolation by generating a green odd line out of the two respective juxtaposed even lines one above, one below. The third component is blue odd, taken either out of 24 or 25 (24 in this case). Blue odd was held in both memories 24, 25 and was used for interpolating a blue even line during the preceding field period, when the green even signal was used on line, and stored in 20 and 21.

Figure 5B:
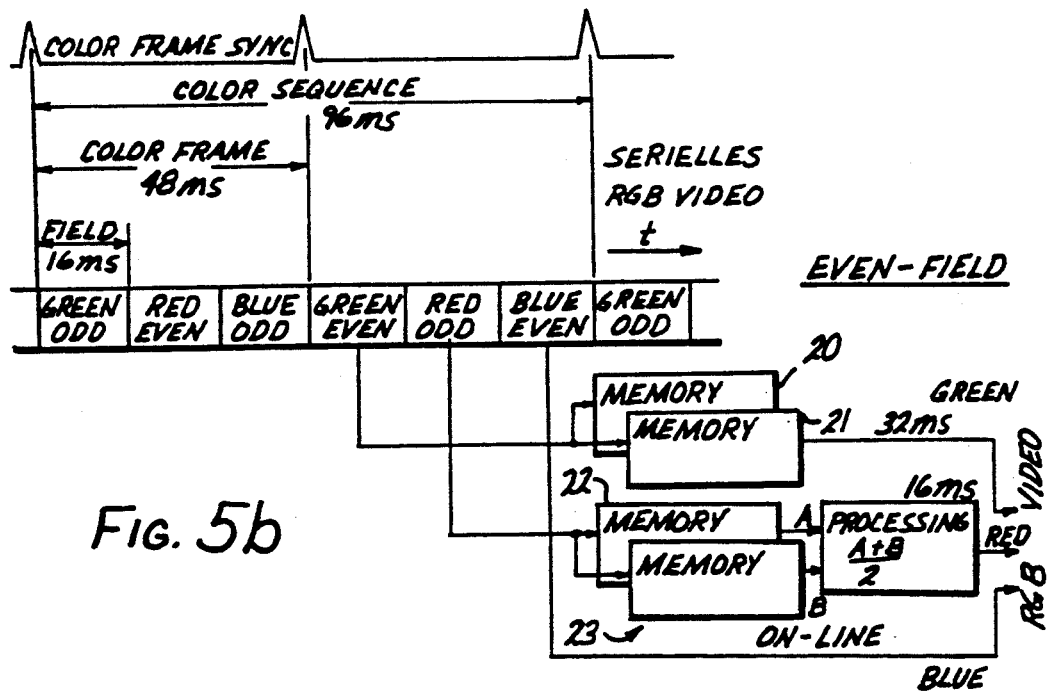

FIG. 5b shows in effect the operation during the next blue even field period; the blue even signal being the on line signal. The red-odd signals were previously stored in memory 22 and 23 and are now used to interpolate a red-even signal and field. The green even field from two field periods back is used from one of the memories, e.g. 21. Thus, it is repeated the algorithm is like this: A signal when arriving is used on line and stored in two memories, to be used for interpolation in the next period and during the next period thereafter, one memory content is used as the fluid but not interpolated signal.

Aside from the RGB exit (41, 42, 43) the decoder may be provided in addition with a exit for signals in the US NTSC standard. The RGB data so produced however can be fed directly for further processing in accordance with either of the European color standards; there will be provided appropriate data bus lines and converters for changing the standardization.

The inventive system has the advantage that color images following taking (pickup) and transmission can be reproduced by means of a color monitor without color distortion and reduction in quality. The receiver is provided with three independent monochromatic images which also permit a three dimensional presentation. Moreover, the system permits the transmission of supplemental information which is independent from the image. For example, voice and other sound information, time encoding information, camera characteristics signals and operating data for the camera. Moreover, it is possible by means of image scanning, using, e.g. scanning gaps such as "free" lines, unused lines or the like, to provide this information independently or simultaneously. This way one could couple still pictures into the running video transmission. The receiver will then provide for a separation of the still pictures and storing them for subsequent, possibly, independent use.

The invention is not limited to the embodiments described above but all changes and modifications thereof, not constituting departures from the spirit and scope of the invention, are intended to be included.

I claim:

1. A TV system, wherein color TV information is broken down into a plurality of fields of monochromatic color information with particular association of color and fields, e.g. in terms of relative occurrence or other color content identifying information for any particular sequence of fields as transmitted, the improvement comprising:

means for alternatingly composing odd/even multicolor field signals, having a plurality of color identifying outputs;

means for extracting an on-line signal from the transmitted signal and feeding the same alternatingly to different outputs of said composing means, depending on the respective color;

storage means for such transmitted signal and storing them separately for the different fields;

means for cyclically variably extracting from the storage means, field signals of color information different from the current on-line signal but pertaining to the same type of field (odd or even), and feeding same as second output to said means for composing; and means for extracting from the storage means field signals of still different color and pertaining to a different type of field (even or odd) and interpolating an image content, and feeding same as a third output to the said means for composing.

2. The improvement as in claim 1, said storage means including two stores for each field both of them alternatingly receiving image increments from the same video line.

* * * * *